(12) United States Patent
Rimhagen et al.

(10) Patent No.: US 8,738,000 B2
(45) Date of Patent: May 27, 2014

(54) METHOD AND APPARATUS FOR GENERATION PROBLEM INDICATIONS IN A CELLULAR RADIO SYSTEM

(75) Inventors: Thomas Rimhagen, Linköping (SE); Fredrik Gunnarsson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/394,424

(22) PCT Filed: Sep. 10, 2009

(86) PCT No.: PCT/SE2009/051007
§ 371 (c)(1),
(2), (4) Date: Mar. 6, 2012

(87) PCT Pub. No.: WO2011/031196
PCT Pub. Date: Mar. 17, 2011

(65) Prior Publication Data
US 2012/0165022 A1    Jun. 28, 2012

(51) Int. Cl.
*H04W 36/00* (2009.01)

(52) U.S. Cl.
USPC ........... 455/437; 455/502; 455/446; 455/436; 455/448; 370/331

(58) Field of Classification Search
USPC ............. 455/502, 446, 561, 456.6, 437, 436, 455/448; 370/331
See application file for complete search history.

(56) References Cited

U.S. PATENT DOCUMENTS

| | | | |
|---|---|---|---|
| 8,326,305 B2 * | 12/2012 | Breau et al. | 455/437 |
| 2002/0012331 A1 | 1/2002 | Takano | |
| 2008/0227455 A1 * | 9/2008 | Kim | 455/436 |
| 2009/0047968 A1 * | 2/2009 | Gunnarsson et al. | 455/446 |
| 2009/0327342 A1 * | 12/2009 | Xiao et al. | 707/104.1 |

(Continued)

FOREIGN PATENT DOCUMENTS

| | | |
|---|---|---|
| GB | 2406472 A | 3/2005 |
| JP | 2002044006 A * | 2/2002 |

(Continued)

OTHER PUBLICATIONS

Amirijoo, M. et al. "Cell Outage Management in LTE Networks." IEEE 6th International Symposium on Wireless Communication Systems, Tuscany, Sep. 7-10, 2009.

(Continued)

Primary Examiner — Khalid Shaheed
(74) Attorney, Agent, or Firm — Murphy, Bilak & Homiller, PLLC

(57) ABSTRACT

In a method and an apparatus for indicating problems data from, typically automatically, entered cell relations is compared to site location information and mobile measurements, if available. An indication of a possible problem is triggered if the comparison indicates that the cell added as neighbors are not suitable as defined by one or many threshold functions. In accordance with one embodiment method of problem indication generation in a cellular radio system is provided. An apparatus receives a neighbor cell relation entries and site location information. The received information is compared and a problem indication is generated if the comparison indicates that cells entered neighbor cells are not close to each other as defined by at least one threshold values.

12 Claims, 4 Drawing Sheets

(56) References Cited

U.S. PATENT DOCUMENTS

| | | | |
|---|---|---|---|
| 2010/0003980 A1* | 1/2010 | Rune et al. | 455/436 |
| 2010/0203881 A1* | 8/2010 | del Rio Romero et al. | 455/423 |
| 2011/0306305 A1* | 12/2011 | Huang | 455/67.11 |

FOREIGN PATENT DOCUMENTS

| | | |
|---|---|---|
| JP | 2009182538 A | 8/2009 |
| WO | 97/32445 | 9/1997 |
| WO | 2008054072 A1 | 5/2008 |

OTHER PUBLICATIONS

3rd Generation Partnership Project. "Cell Clustering and Feedback for CoMP," 3GPP TSG RAN WG1 Meeting #56b, R1-091189, Seoul, Korea, Mar. 23-27, 2009.

* cited by examiner

METHOD AND APPARATUS FOR GENERATION PROBLEM INDICATIONS IN A CELLULAR RADIO SYSTEM

TECHNICAL FIELD

The present invention relates to a method and an apparatus for generation of problem indications caused by a problematic orientation of an antenna used for transmitting signals in a cellular radio system

BACKGROUND

The third generation partnership project (3GPP) is currently working on standardization the next generation of mobile communication system denoted Long Term Evolution (LTE). The architecture of the LTE system is shown in FIG. 1. In FIG. 1 the logical interfaces (S1) between the evolved Node Bs (eNBs) and the Mobility Management Entities (MME)/Serving Gateway (S-GW) and the interfaces (X2) between the eNBs are shown.

In LTE the downlink is based on orthogonal frequency division multiplexing (OFDM) while the uplink is based on a single carrier modulation method known as discrete Fourier transform spread OFDM (DFT-S-OFDM), see 3GPP TR 36.300, Evolved Universal Terrestrial Radio Access (E-UTRA) and Evolved Universal Terrestrial Radio Access (E-UTRAN); Overall description; Stage 2, V8.2.0.

The coverage of a cell in a wireless network depends on numerous parameters. Some of them are related to the cell selection procedure, determining the most suitable cell for establishment of communications links. Such parameters can be seen as relative parameters, since the coverage of one cell may be expanded and other cells in the vicinity will be diminished accordingly.

Other parameters can be seen as absolute parameters, and are related to the link quality alone, essentially whether at least one cell can provide acceptable link quality for communications on a given location.

The primary means to change the coverage area of a cell is to change the reference signal power or the orientation (tilt, azimuth, height) of the serving antenna branch. Such action will change the area where the cell is perceived as the main alternative for communications, and will reduce its interference to users in areas where the cell is not perceived as the main alternative.

The antenna orientation is changed by adjusting one or several of the following.

Vertical tilt, either mechanical (the mounting angle is altered) or electrical (antenna elements internally in the antenna branch are altered, changing the antenna pattern).

Horizontal beam direction (azimuth)

Height

Each cell in a network is identified by a globally unique identity GID, and a locally unique physical cell identity PCID. The former is a unique bit string, typically long, signalled in the system information, while the latter is an integer such as 0-503 in LTE, and 0-511 in Wideband Code Division Multiple Access (WCDMA) associated to a physical reference signal sequence which the mobile can use to identify a cell on the physical layer. When a mobile station discovers a candidate cell it reports PCID of the cell to its serving cell.

In LTE, if this PCID is unknown to the serving cell it can request the mobile to decode and report the globally unique GID of the cell to uniquely identify it. This enables neighbour cell relation lists to be established automatically by the radio base station evolved Node B (eNodeB). The neighbour cell relation list changes are also sent to the domain manager and/or some other central node, which maintains an updated logical network model, including the neighbour cell relations. The eNodeB receives network addressing information about the candidate cell and is then able to setup a direct X2 connection between the two eNodeBs.

In WCDMA, the Radio Network Controller (RNC) manages a list of candidate cells, and sends such a list to the mobile station—the monitored set. If a PCID outside this list is discovered, the mobile can report such a cell as well—the detected set cell. If the detected set cell can be identified in RNC, then it can be possible to perform handover also to such a cell. If the detected set cell can not be identified in a central node, e.g. in an Operation and Maintenance O&M node, most likely handover is not possible, but the cell can be considered for inclusion in the monitored set.

In both LTE and WCDMA, the PCIDs are not globally unique, but with careful assignments, they can be locally unique which means that the mobile can report a candidate cell by its PCID, and the serving cell can determine the likely cell if the PCID is listed in the serving cells neighbour cell relation list, and initiate handover to this cell. Also in this case, a central node can maintain a logical network model including the neighbour cell relations.

To optimize the antenna orientations, and other cell size optimizations, is an information intensive task, since the coverage needs to be carefully explored. One option is to obtain information from a cell planning tool, and rely on the path loss predictions to be accurate. Another option is to obtain the information from extensive drive tests. However, this is a work intensive task, very costly and highly inefficient for determining the need for antenna re-orientation.

Hence, there exists a need for a method and apparatus that enables more efficient cell size optimization, for example antenna re-orientation procedures.

SUMMARY

It is an object of the present invention to enable improved methods and apparatuses for cell size optimization, such as by means of antenna re-orientation.

It is another object of the present invention to provide a method and apparatus that facilitates error detection in the configuration of a cellular radio system.

At least one of these objects is obtained by the method and apparatus as set out in the appended claims. Thus, in a method and an apparatus for indicating problems data from, typically automatically, entered cell relations is compared to site location information. Additionally, mobile measurements can be used in the comparison. An indication of a possible problem is triggered if the comparison indicates that the cell added as neighbours are not close to each other as defined by one or many threshold values.

In accordance with one embodiment method of problem indication generation in a cellular radio system is provided. An apparatus receives a neighbor cell relation entries and site location information. The received information is compared and a problem indication is generated if the comparison indicates that cells entered neighbour cells are not close to each other as defined by at least one threshold values.

In accordance with one embodiment information about non-suitable neighbor cell relations is aggregated to compile non-suitable neighbor cell relation statistics, and generating the problem indication based on the non-suitable neighbor cell relation statistics.

In accordance with one embodiment additional data can be used when identifying a possible problem. For example, further mobile assisted measurements can be used, such as the location of the mobile that identified a cell relation, handover statistics, signal strength measurements; etc can be used in addition or as an alternative when identifying a possible problem.

In accordance with one embodiment problem indication is generated when the distance between site locations of two cells exceeds a threshold value.

In accordance with one embodiment generated problem indications are filtered. In particular indication can be accumulated and a problem indication output when the number of accumulated problem indications exceeds a pre-determined threshold.

The generated problem indications can advantageously be used for cell size optimization and trouble shooting in a cellular radio system. The indications can hence be used to identify candidate cells for cell size adjustment. The cell size can then be corrected by means of antenna re-orientation, power adjustment or other suitable measures.

The invention also extends to apparatuses adapted to implement the methods in accordance with the above. The invention can advantageously be deployed in an LTE system as the input data is already collected by the ANR algorithm of an LTE system.

BRIEF DESCRIPTION OF THE DRAWINGS

The present invention will now be described in more detail by way of non-limiting examples and with reference to the accompanying drawings, in which.

DETAILED DESCRIPTION

The below description is using terminology used within the context of LTE. The invention is, however, not limited to use in an LTE system. The invention can hence be used in any type of cellular radio system.

Figure 1:
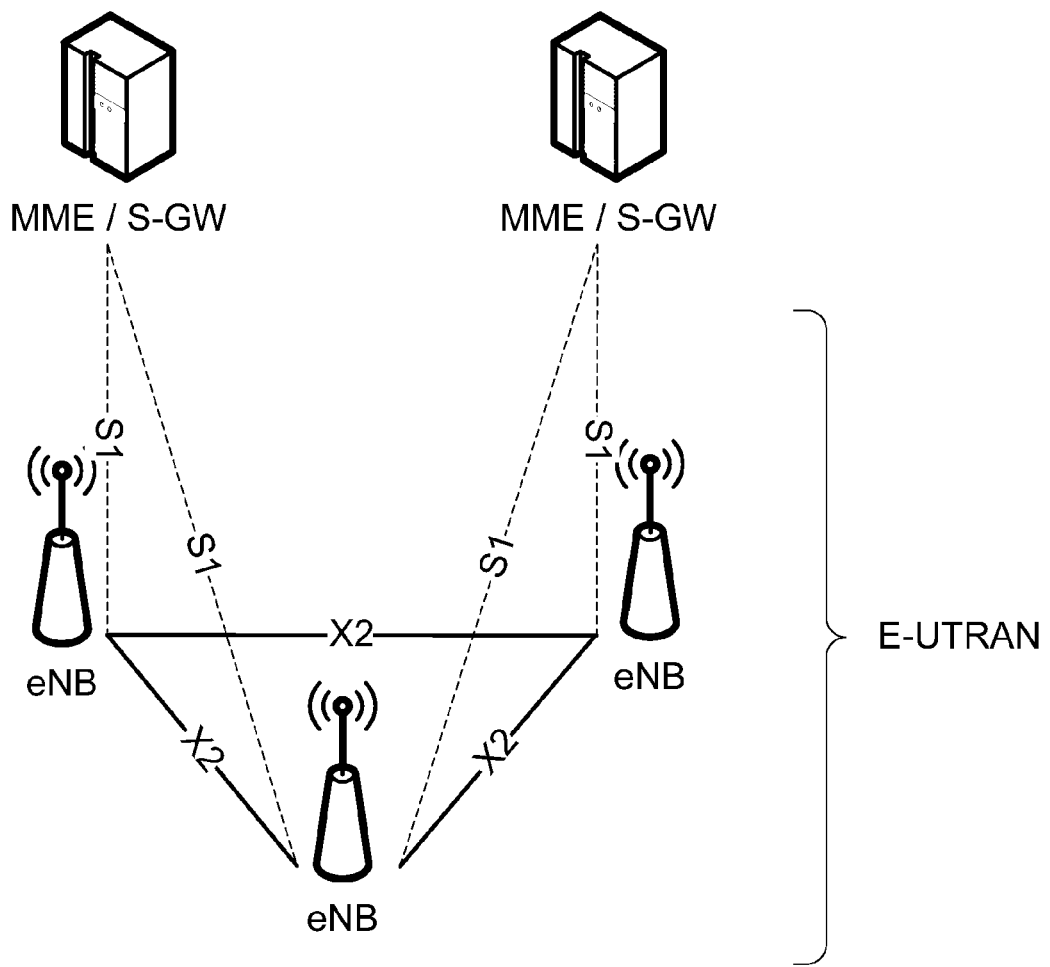
FIG. 1 is a general view of a cellular radio system.
Figure 2:
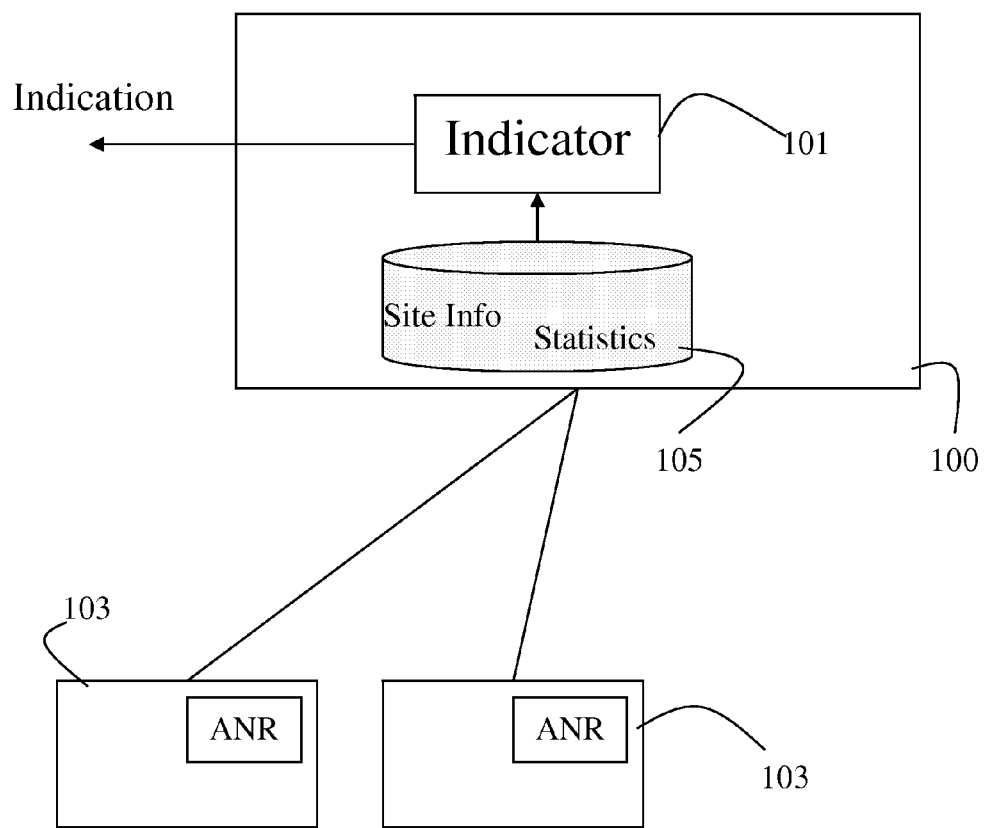
FIG. 2 is a view of a system comprising an apparatus for identifying possible problems in a cellular radio system.

In FIG. 2 a view of an apparatus 101 in a node 100 for indicating possible problems in a cellular radio network is depicted. The apparatus 101 is connected to a number of modules 103 generating entries of cell relations. In FIG. 2 an exemplifying architecture is depicted, where an Automatic Neighbour cell list Procedures (ANRs) automatically update the network model of the cellular radio system. The ANRs can for example be ANRs of an LTE system. The information of the network model is stored in a module 105 of the node 100. Furthermore, site location information, such as site location and cell configuration are also stored in the module 105. Additional mobile assisted measurements in the statistics, which possibly is gathered over time can also be stored in the module 105.

Information from the module 105 is fed to the indicator 101. The indicator 101 is adapted to generate an indication of a possible problem when a comparison with the site location data indicates that the cells added as neighbours are not close to each other as defined by one or many threshold values.

Based on an indication, the operator of the cellular network can proceed and take appropriate measures. For example the operator can proceed to conduct reorientation optimization using any procedure or mechanism, possibly based on more rich feedback from ARI than just an indication to better describe the severity of the reorientation needs.

Figure 3:
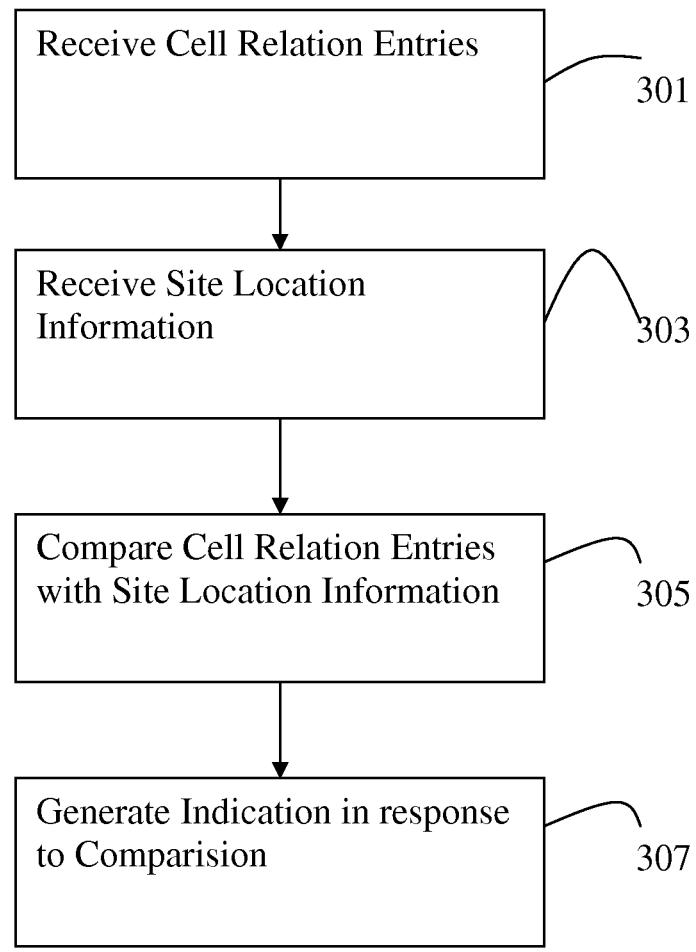
FIG. 3 is a flowchart illustrating some procedural steps performed when generating an indication of a possible problem in a cellular radio network.

In FIG. 3 a flowchart illustrating some procedural steps performed when generating an indication of a possible problem in a cellular radio network is depicted. First in a step 301 neighbor cell relation entry are received and stored in the module 105. Next in a step 303 site location information is received and stored in the module 105. In accordance with one embodiment received mobile measurements can also be stored and used as site location information. Next, the received neighbour cell relation entries are compared with the receiving site location information in a step 305. Thereupon, in a step 307, a problem indication is generated if the comparison indicates that cells entered neighbour cells are not close to each other as defined by at least one threshold values.

In accordance with one embodiment, a domain manager maintains an updated logical network model including the neighbour cell relations. In another embodiment, an updated logical network model including the neighbour cell relation information can be maintained in a different central node, or in the eNodeB. In addition, the node, such as a domain manager, other central node, eNodeB can be configured to gather information about site and cell configurations and statistics from mobile assisted measurements.

Below some detailed examples of gathering of information are described.

The apparatus 101 for indication a possible problem in a cellular radio network determines the non-suitability of cell relations between a serving cell and neighbour cells and outputs a corresponding output signal. This apparatus 101 will also be denoted problem indicator herein. This determination can originate from different procedures within the apparatus.

The problem indicator can comprise a central processor in that collects non-suitability information from all procedures, applies appropriate filtering and triggers an indication, for example antenna reorientation indications or other change of parameters controlling cell area for the indicated cell. The different procedures can be based on:

Site distance, i.e. the distance between neighbours and the serving cell.
Detection distance, i.e. the distance between the detecting mobile and the two sites of the cell relation.
Handover distance, i.e. the same as detection distance, but gathered from not only the detected mobile but also from mobiles performing handovers
Detection received signal strength or quality, i.e. the radio condition perceived by the detecting mobile.
Handover received signal strength or quality, i.e. the radio condition perceived by mobiles performing handovers.
Handover success information, i.e. whether the handover failed or not.
Combinations of any of the above
The procedures can also consider:
Site distance compared to a regional average site distance (e.g. the average neighbour distance in all neighbours)
Total number of neighbours
Number of neighbours compared to a regional average (e.g. the number of neighbours in all neighbours)
Geometry
Number of neighbours within distance $\delta$ from the line connecting $p_s$ and $p_c$ (or sum of all $\delta_i^2$, over all neighbours $i \neq p$ and $s$).

Figure 4:
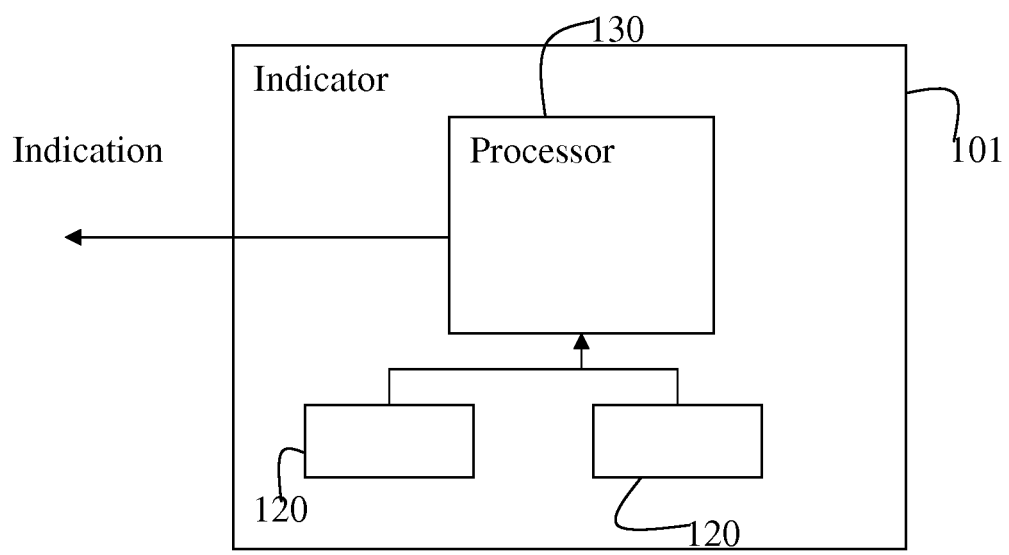
FIG. 4 is a view of an apparatus for identifying possible problems in a cellular radio system

FIG. 4 is a more detailed illustration of an apparatus 101 for indicating possible problems in a cellular radio network comprising different modules 120 for determining non-suitability events, and a processor 130 for aggregating and filtering the events, and trigger indications when needed. The trigger indication can for example be used for antenna reorientation indication. The indication can be divided into several different procedures 120, which each analyze the neighbour cell relations for non-suitability and send non-suitability events to a processor that aggregates and filters the events and triggers the indications.

Site Distance

In accordance with one embodiment the apparatus 101 gathers information about site locations. All recently added neighbour cell relations between a serving cell and a candidate cell, for example a first cell and a second cell are examined for non-suitability examination based on site locations only, from which the site distance $D_{sc}$ is determined.

$$D_{sc}=\|p_s-p_c\|$$

Where $D_{sc}=\|p_s-p_c\|$ is the Euclidian distance between the sites. For example for two-dimensional positions $p_s=(x_s, y_s)$ and $p_c=(x_c, y_c)$ the distance is calculated as $$D_{sc}=\sqrt{(x_s-x_c)^2+(y_s-y_c)^2}$$

A neighbour cell relation can be determined to be non-suitable if the site distance exceeds a pre-determined threshold $T_{site}$.

$$D_{sc}=\|p_s-p_c\|>T_{site}$$

In another embodiment, the threshold $T_{site}$ is calculated as a function of the site distances of all existing neighbour cell relations for the serving and candidate cells, for example the mean value in the region Detection Distance In another embodiment, a mobile station or mobile stations reporting a candidate cell is also requested to report its location $p_m$, or alternatively the location of the reporting mobile station or mobile stations is determined by the network. This can be used to determine a relative mobile to site distances to the serving and candidate cells $D_{ms}$ and $D_{mc}$ respectively.

$$D_{ms}=\|p_m-p_s\|, D_{mc}=\|p_m-p_c\|$$

Also a detection distance parameter, combining the relative mobile to site distances for the serving and candidate cells is calculated $$D_{msc}=f(D_{ms},D_{mc})$$

One example of a detection distance parameter is the total detection distance $$D_{msc,tot}=D_{ms}+D_{mc}$$

A neighbour cell relation can be determined to be non-suitable if the detection distance parameter exceeds a pre-determined threshold $T_{detdist}$.

$$D_{msc,tot}=D_{ms}+D_{mc}>T_{detdist}$$

In one embodiment, the threshold $T_{detdis}$ can be calculated as a function of the detection distance parameter of all existing neighbour cell relations for the serving and candidate cells, for example the mean value.

Handover Distance

In one embodiment, the detection distance parameter is calculated for each handover event or a subset of all handover events and cell-specific handover distance parameter statistics can be established. Some statistical measure, such as $x^{th}$ percentile, mean, etc. can be applied to the statistics, and a neighbour cell relation is determined to be non-suitable if the statistical measure of the handover distance parameter exceeds a pre-determined threshold $T_{HOdist}$.

In one embodiment, the threshold $T_{Hodist}$ can be calculated as a function of the handover distance parameter statistics of all existing neighbour cell relations for the serving and candidate cells, for example the mean value.

This statistics can also be used to calculate an appropriate value of the detection distance threshold $T_{detdis}$, for example as a percentile of the handover distance parameter.

Detection Received Signal Strength or Quality

In one embodiment, the mobile station or mobile stations detecting a proposed neighbour cell relation also reports the reference signal received power (RSRP) and/or the reference signal received quality associated to at least the serving and candidate cells, possibly also to other cells.

A neighbour cell relation can then be determined to be non-suitable if at least two of the reported cells have a RSRP greater than a pre-determined threshold $T_{meas}$. This situation means that there are more than one cell alternative that could provide services.

In one embodiment, a neighbour cell relation is determined to be non-suitable if the $x^{th}$ best, x being a positive integer, of the reported cells have a RSRP greater than a pre-determined threshold $T_{meas}$. Sometimes these problems are denoted 'pilot pollution'.

In one embodiment, the threshold $T_{meas}$ can be calculated based on reported RSRP from served mobile stations reporting candidate cells that already are listed in the neighbour cell relation list.

Handover Received Signal Strength or Quality

In one embodiment, the mobile station or mobile stations performing handover reports the reference signal received power (RSRP) and/or the reference signal received quality associated with at least the serving and candidate cells, and possibly also to other cells.

A neighbour cell relation can be determined to be non-suitable if at least some percentage, such as y percent, of the handovers have two of the reported cells with a RSRP greater than a pre-determined threshold $T_{meas}$. This situation means that there are more than one cell alternative that could provide services in a large fraction of the handover region.

Handover Success Information

In one embodiment, a neighbour cell relation can be determined to be non-suitable if the handover success rate is below a pre-determined threshold $T_{HOsuccess}$.

$$HO_{success}<T_{HOsuccess}$$

Combinations to Determine Non-Suitable Neighbour Cell Relations

In accordance with other embodiments combinations of two or more of the listed criteria above can also be used to determine whether a neighbour cell relation is non-suitable or not.

For example, in accordance with one embodiment, a neighbour cell relation can be determined to be non-suitable if the site distance exceeds a threshold $T_{site}$ and the third best reported cell in terms of RSRP has a RSRP greater than $T_{meas}$.

In another embodiment, a neighbour cell relation is considered to be non-suitable if a detection distance parameter exceeds a threshold $T_{detdist}$ and the third best reported cell in terms of RSRP has a RSRP greater than $T_{meas}$.

In yet another embodiment, a neighbour cell relation can be determined to be non-suitable if the site distance exceeds a threshold $T_{site}$ and the detection distance parameter exceeds a threshold $T_{detdist}$.

Association, Filtering and Indication Triggering

As a result of the above non-suitability events will be generated per proposed neighbour cell relation. A reported event can be subject to:

Association to One or Both of the Cells in the Neighbour Cell Relation

In one embodiment, both cells count the non-suitability event. In alternative embodiments, the association is based on which cell in the relation that was serving cell, the reported RSRP per cell, the relative site distance, the traffic load of the cells, which cell that is served by an antenna that can be remotely adjusted, etc Filtering of the Non-Suitability Events Filtering can be performed by for example by a leaky bucket filter where the event counter is decreased regularly, but never below zero.

Indication Triggering

An indication, such as an antenna reorientation indication, can be triggered when, the possibly filtered non-suitability event counter, exceeds a pre-determined threshold.

The output of the indication mechanism can for example be a list of proposed work tasks for re-sizing a cell such as antenna reorientation tasks or change of other parameter such as power output in a cell. In addition, the indication can be richer, for example indicating the severity of the indication etc, e.g. based on the non-suitability event data. For example, such data can be used to disclose a cause for why the indication is triggered.

Even though LTE has been used as the primary example, the mechanisms are applicable to other radio access technologies as well including WCDMA.

Also, Neighbour cell relations that have been determined as non-suitable possibly after association, aggregation and filtering can be considered in the domain manager for example by black-listing the neighbour cell relation while awaiting the antenna reorientation to be completed. It is also possible that a neighbour cell relation determined as non-suitable are be kept as neighbours, as there could still be several locations where the neighbour cell relation works well for many end users. Nevertheless, the antenna reorientation indication reveals potential RF problems that the operator may want to look into.

The use of a problem indicator as described herein will facilitate many work intensive tasks. For example the problem indictor can be used as input data to an automatic antenna reorientation indication that enables more efficient use of drive test resources, since once indicated the efforts can be spent to resolve the identified troublesome situations and regions, while avoiding spending efforts on appropriately planned regions.

The invention claimed is:

1. A method, in a node of a cellular radio system, of problem indication generation in the cellular radio system, the method comprising:
   receiving a neighbor cell relation;
   receiving site location information for one or more cells;
   determining a distance value from the received neighbor cell relation and the received site location information; and
   generating a problem indication if the distance value exceeds a threshold value.

2. The method of claim 1, wherein the site location information comprises at least one of: system information of site locations; first information from one or more mobile stations identifying the neighbor cell relation; and second information from one or more mobile stations performing handover between cells of the neighbor cell relation.

3. The method of claim 1, the method further comprising aggregating information about non-suitable neighbor cell relations to compile non-suitable neighbor cell relation statistics, wherein generating the problem indication is based on the non-suitable neighbor cell relation statistics.

4. The method of claim 1, further comprising filtering generated problem indications.

5. The method of claim 4, wherein said filtering comprises accumulating a number of problem indications and outputting a problem indication when the number of accumulated problem indications exceeds a pre-determined threshold.

6. The method of claim 1, further comprising using the problem indications as input to adjusting cell sizes of the cellular system.

7. The method of claim 6, wherein the problem indications are used to re-orient base station antennas in the cellular radio system.

8. An apparatus for problem indication generation in a cellular radio system, the apparatus comprising:
   means for receiving a neighbor cell relation;
   means for receiving site location information for one or more cells;
   means for determining a distance value from the received neighbor cell relation and the received site location information; and
   means for generating a problem indication if the distance value exceeds a threshold value.

9. The apparatus of claim 8, wherein the site location information comprises at least one of: system information of site locations; information from one or more mobile stations identifying the neighbor cell relation; and information from one or more mobile stations performing handover between cells of the neighbor cell relation.

10. The apparatus of claim 8, the apparatus further comprising:
    means for aggregating information about non-suitable neighbor cell relations to compile non-suitable neighbor cell relation statistics, and means for generating the problem indication based on the non-suitable neighbor cell relation statistics.

11. The apparatus of claim 8, further comprising means for filtering generated problem indications.

12. The apparatus of claim 11, further comprising means adapted to accumulate a number of problem indications and outputting a problem indication when the number of accumulated problem indications exceeds a pre-determined threshold.

* * * * *